United States Patent

Iitsuka

[19]

[11] Patent Number: 5,954,192

[45] Date of Patent: Sep. 21, 1999

[54] KNOB POSITIONING STRUCTURE

[75] Inventor: Yoshitsune Iitsuka, Kanagawa, Japan

[73] Assignee: Yaesu Munsen Co., Ltd., Tokyo, Japan

[21] Appl. No.: 09/139,253

[22] Filed: Aug. 25, 1998

[30] Foreign Application Priority Data

Oct. 30, 1997 [JP] Japan ................................... 9-010090

[51] Int. Cl.⁶ ................................................. H01H 19/14
[52] U.S. Cl. ........................................ 200/336; 200/564
[58] Field of Search .................................... 200/548, 556, 200/564, 565, 567, 293–296; 74/527

[56] References Cited

U.S. PATENT DOCUMENTS

| 2,201,881 | 5/1940 | Bryant et al. ............................. 200/8 |
| 4,082,925 | 4/1978 | Hufford ................................. 200/11 G |
| 4,894,500 | 1/1990 | Yamazaki et al. ....................... 200/565 |

*Primary Examiner*—Michael L. Gellner
*Assistant Examiner*—Nhung Nguyen
*Attorney, Agent, or Firm*—Pillsbury Madison & Sutro LLP

[57] ABSTRACT

A knob positioning structure comprises a rotary switch shaft, to which a knob is mounted, the rotary switch being mounted in a depression in an enclosure, within which are formed detent points. A threaded hole is formed in the end of the shaft onto which the knob is to be mounted, and outer serrations are formed around the end of the shaft. The knob has a knob mounting screw hole through which a knob mounting screw can be passed, a knob stopper which mates with a detent point in the depression of the enclosure, and inner serrations, which mate with the outer serrations of the shaft. The knob is mounted to the shaft by inserting a knob mounting screw, via a spring, through the knob mounting screw hole and into the threaded hole in the shaft, enabling a sliding motion between the knob and the shaft in the direction of the shaft axis.

2 Claims, 2 Drawing Sheets

KNOB POSITIONING STRUCTURE

BACKGROUND OF THE INVENTION

1. Field of the Invention

The present invention relates to a structure for attaching a knob for use with a rotary switch.

2. Brief Description of Related Art

Rotary selector switches are used to make selection of a variety of settings, such as channel selection, in portable radio communication equipment and other electronic equipment. In portable radio equipment, as the size of the equipment is reduced, these rotary switches become small, many now occupying a space of less than 1 centimeter square.

While a compact rotary switch features a highly precise structure, because of its small size, it provides poorly defined rotational resistance as tactile feedback to the operator when it is operated. In addition, because of only a small force which holds such a rotary switch at any given setting position, it can be rotated inadvertently by accidentally touching it, thereby changing the setting condition and requiring the setting to be corrected.

SUMMARY OF THE INVENTION

Accordingly, it is an object of the present invention to provide a knob positioning structure that provides supplementary holding force for a knob that is used to make a selection of a rotary switch position setting.

A knob positioning structure according to the present invention comprises a shaft of a rotary switch to which a knob is attached, in the end of which is formed a threaded hole and around the circumference of the end of which are formed outer serrations which are parallel to the axis of the shaft. The rotary switch is mounted into a depression that is formed in an enclosure of the equipment in which the switch is used. An inner surface of this depression has formed in it detent points, which correspond to setting positions of the rotary switch. The structure further comprises a knob for the purpose of operating the rotary switch. This knob having a knob stopper which is used to select the detent positions and an inner surface in which are formed inner serrations which mate with the outer serrations of the shaft of the rotary switch when the knob is fitted over the end of the shaft. The top of the knob has formed in it a knob mounting screw hole, and a knob mounting screw that is passed through this hole, with a spring between the knob and the knob mounting screw, into the threaded hole in the end of the shaft, so as to mount the knob to the shaft end in a manner that allows a sliding action between the inner serrations of the knob and the outer serrations on the shaft. Using the above-noted knob positioning structure, it is possible to make reliable selection of a setting position of the rotary switch and, once set, that position is held by the above-noted structure.

BRIEF DESCRIPTIONS OF THE DRAWINGS

FIG. 2(*b*) is the view of the detent points that could be expected to be seen in the direction indicated as A in FIG. 2(*a*).

DETAILED DESCRIPTION OF THE INVENTION

A preferred embodiment of the present invention is described below in detail, with reference being made to the relevant accompanying drawings.

Figure 1:
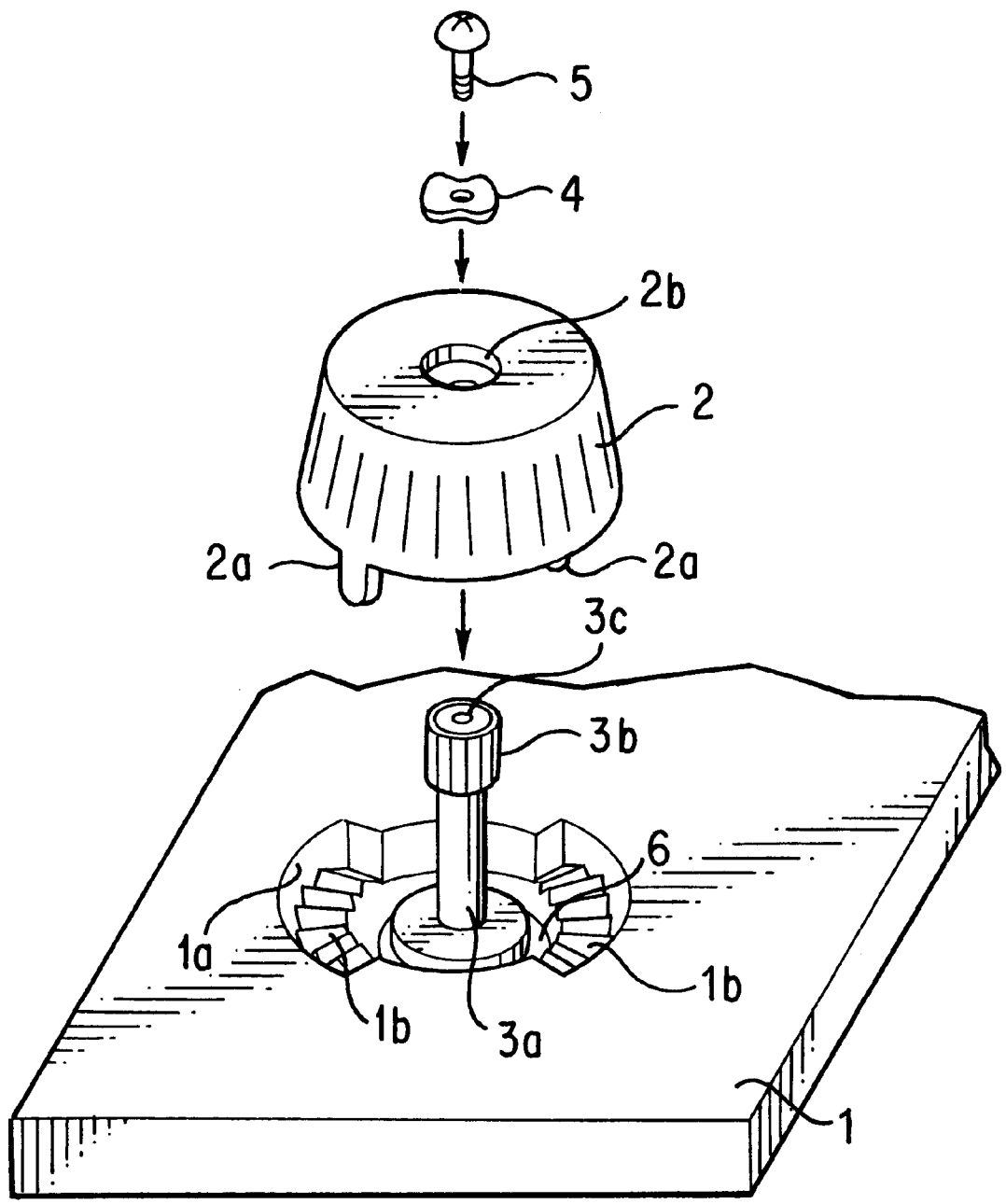
FIG. 1 is an exploded perspective view which illustrates a knob positioning structure according to an embodiment of the present invention.
Figure 2A:
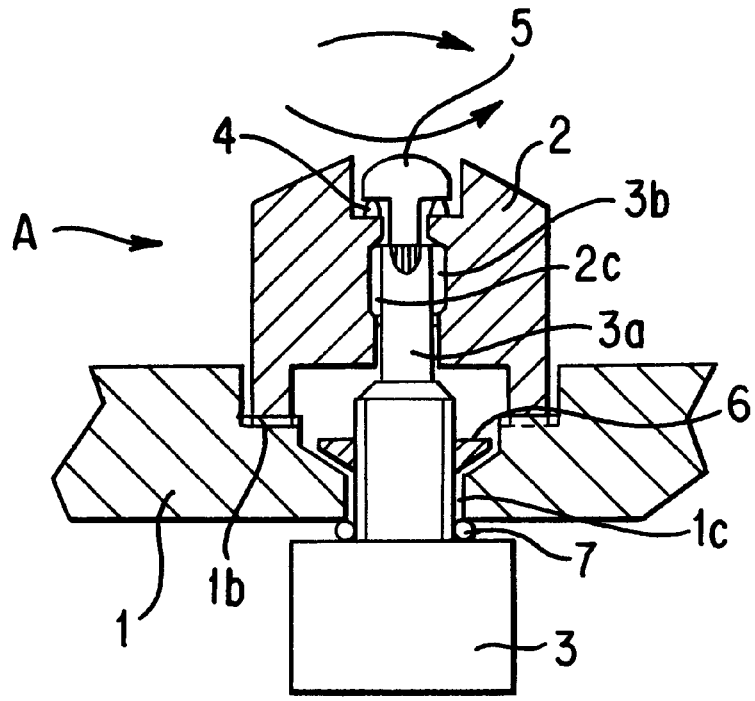
FIG. 2(*a*) is a cross-sectional view of the knob positioning structure of FIG. 1.
Figure 2B:
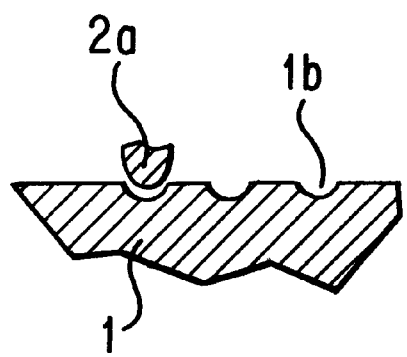

FIG. 1 is an exploded perspective view which illustrates the knob positioning structure of the present invention, and FIG. 2 presents two cross-sectional views thereof. An embodiment of the present invention will be described with reference to FIG. 1 and FIG. 2. In these drawings, the reference numeral 1 denotes an enclosure, 2 is a knob, 3 is a rotary switch, 4 is a wave spring washer or coil spring, 5 is a knob mounting screw, 6 is a tapered nut, and 7 is an O-ring.

A hole 1*c*, for the purpose of passing a shaft 3*a* of the rotary switch, is formed in the center of the position of the enclosure 1 at which the rotary switch 3 is to be mounted, a depression 1*a* being formed in the area surrounding the hole 1*c*. In this depression 1*a* are formed detent points 1*b* which correspond to setting the positions of the rotary switch 3. For example, a channel-selector switch for 8 channels would have detent points 1*b* corresponding to these 8 channels. The rotary switch 3 is mounted into the hole 1*c* of the depression 1*a* by the tapered nut 6, with the O-ring 7 intervening therebetween. The shaft 3*a* of the rotary switch 3 has formed in its end a threaded hole 3*c* which accepts the knob mounting screw 5, and also has outer serrations 3*b* formed around the outside of its end part.

The knob 2 has a knob stopper 2*a* which mates with a detent point 1*b* so as to establish the position of the knob. It further has a knob mounting screw hole 2*b* for passage of the knob mounting screw 5, and inner serrations 2*c*, which mate with the outer serrations 3*b* of the rotary switch 3 when the knob 2 is fitted over the shaft end.

To mount the knob 2 to the rotary switch 3, the rotary switch 3 is rotated fully in one direction, and the knob 2 is similarly rotated so that its stopper 2*a* is positioned so as to mate with a detent point 1*b* at this end of rotation, the knob 2 being fitted over the shaft 3*a* so that the inner serrations 2*c* of the knob 2 are caused to mate with the outer serrations 3*b* of the rotary switch 3. Next, the knob mounting screw 5 is passed through the hole 2*b* at the top part of the knob mounting screw hole 2*b*, into which the spring 4 has been inserted, and is screwed into the threaded hole 3*c* of the rotary switch 3. Because of the resiliency of the spring 4, the knob mounting screw 5 pushes the knob 2 slidably in the axial direction of the shaft 3*a*, so that the knob stopper 2*a* is caught in an opposing detent point 1*b*, thereby positioning the knob 2 with good stability.

The action when the knob is operated is as follows. When the knob 2 is rotated so as to operate the rotary switch 3, the knob stopper 2*a* climbs up and over the boundary between the current detent point 1*b* and an adjacent detent point 1*b* in the enclosure 1. In this condition, the spring 4 through which the knob mounting screw 5 is inserted is compressed by the resulting sliding action of the knob 2 as the knob stopper 2*a* rises to cross over the boundary between the detent points 1*b*. After it crosses this boundary, the spring force of the spring 4 acts to press the knob 2 in the axial direction of the shaft 3*a*, thereby pressing the knob stopper 2*a* the next detent point 1*b* and holding it at that position. By successively repeating this operation, the rotary switch 3 can be set to the desired position and, once set, the rotary switch 3 does not move from its selected rotational position by the application of a slight shock.

As is clear from the above description of the present invention, the present invention does not impose any particular restriction on the number of knob stoppers 2*a*. However, it is preferable that the knob 2 have a set of two such knob stoppers 2*a,* these being disposed at opposing positions on a diameter of a circle that is concentric to the knob.

While the shrinking size of rotary switches has resulted in difficulty in holding the rotary switch at a desired setting position because of an insufficiency of force that holds the switch in place, according to the above-described structure of the present invention, a knob stopper that is provided on the knob is slidably pressed up against detent points that are provided in the enclosure in which the rotary switch is mounted, the repelling force of a wave spring washer or coil spring being used to press the knob slidably in the shaft axial direction so that the knob stopper is caught at a detent point, thereby holding the knob and, by extension, the rotary switch at the desired rotational position.

What is claimed is:

1. A knob positioning structure comprising:

a shaft of a rotary switch, onto the end of which are formed outer serrations, and in the end face of which is formed a threaded hole;

an enclosure, into which is formed a depression into which the rotary switch is mounted, detent points being formed on an inner surface thereof;

a knob for operating the rotary switch, said knob having a knob stopper which selects one of said detent points, and inner serrations that mate with the outer serrations of said shaft, these being formed on an inner surface thereof, and having formed in the top part thereof a knob mounting screw hole;

a spring; and a knob mounting screw;

wherein said knob mounting screw is passed through said knob mounting screw hole via said spring and is screwed into said threaded hole of said shaft, thereby mounting said knob to said shaft so as to enable mutual sliding therebetween in the axial direction.

2. A knob positioning structure according to claim 1, wherein said knob has a plurality of knob stoppers.

* * * * *